Feb. 25, 1936.  W. W. HARTMAN  2,031,949
MECHANISM TO ASSEMBLE A COMPOSITE LOAF
Filed Oct. 24, 1932   3 Sheets-Sheet 1
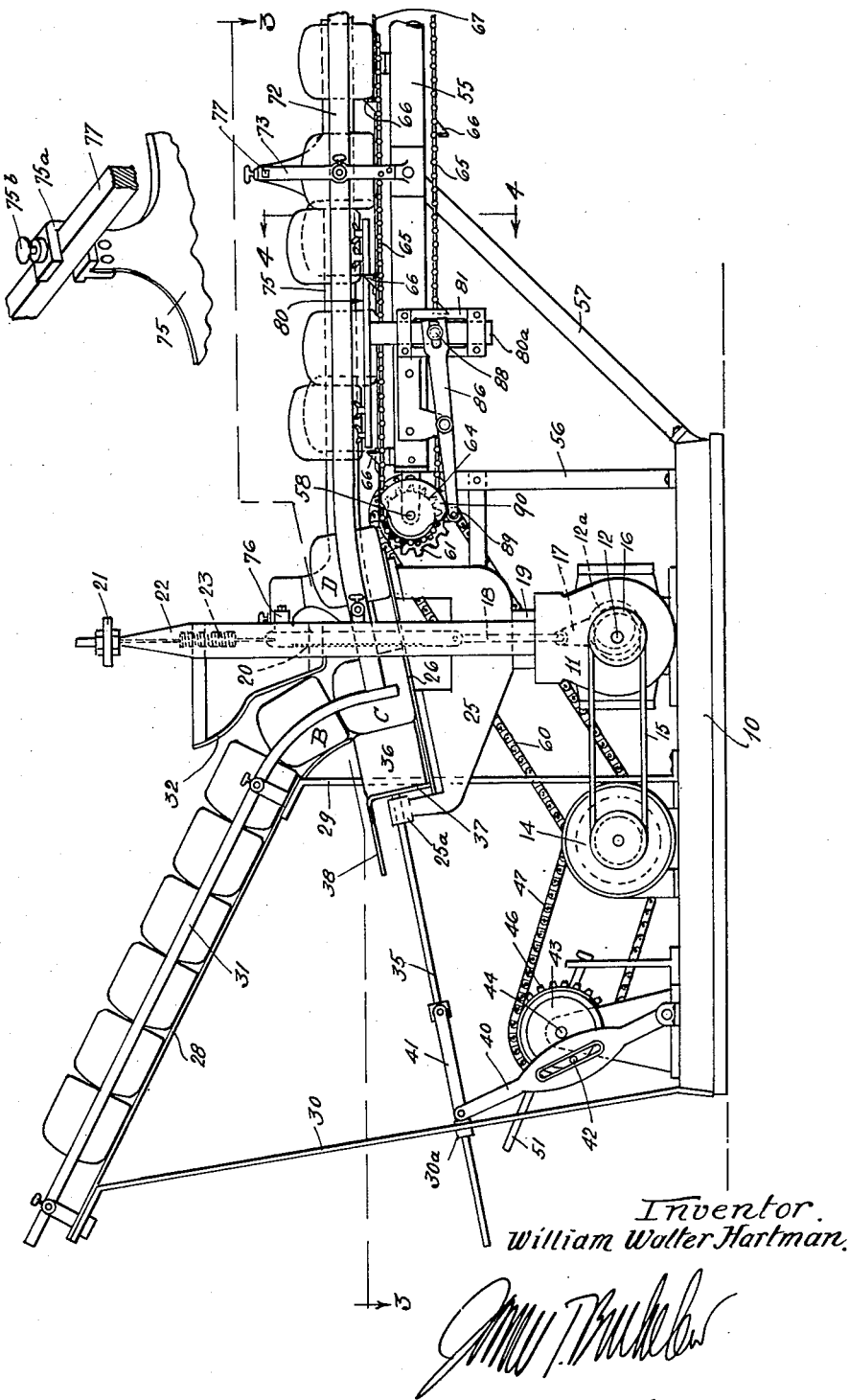
Inventor.
William Walter Hartman.
Attorney.

Feb. 25, 1936.  W. W. HARTMAN  2,031,949
MECHANISM TO ASSEMBLE A COMPOSITE LOAF
Filed Oct. 24, 1932   3 Sheets-Sheet 2
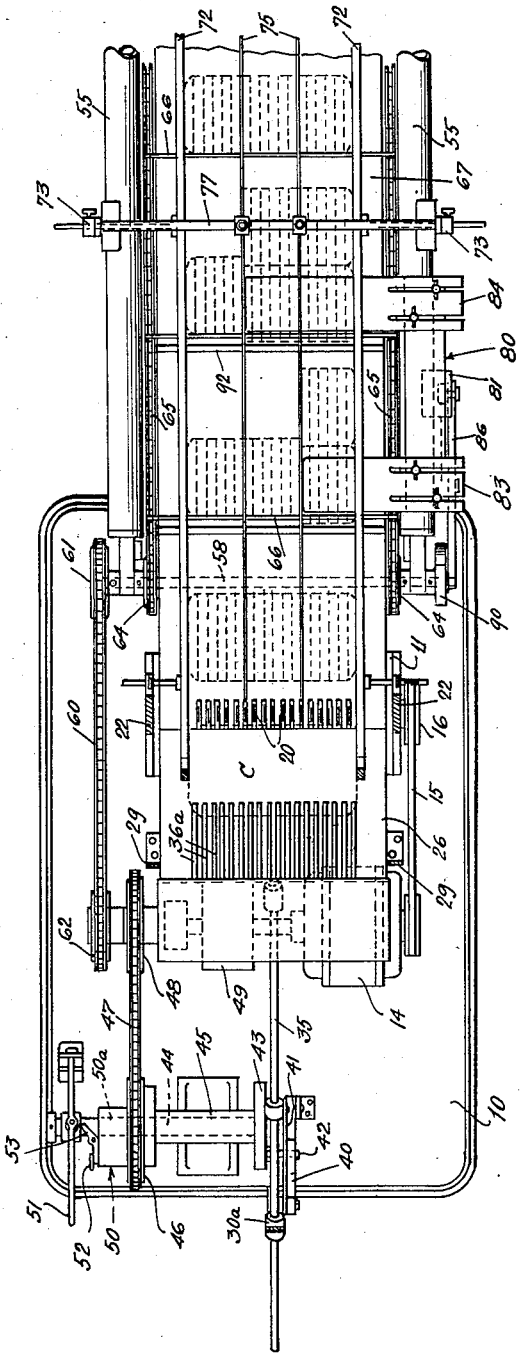
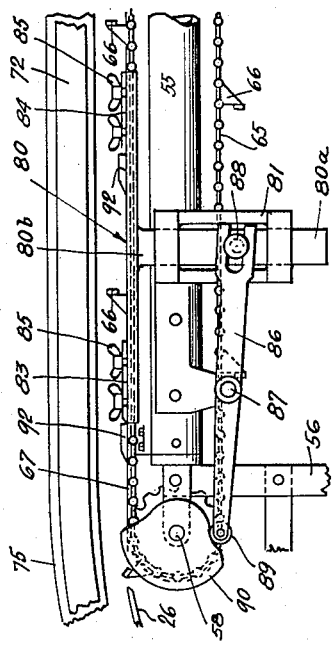
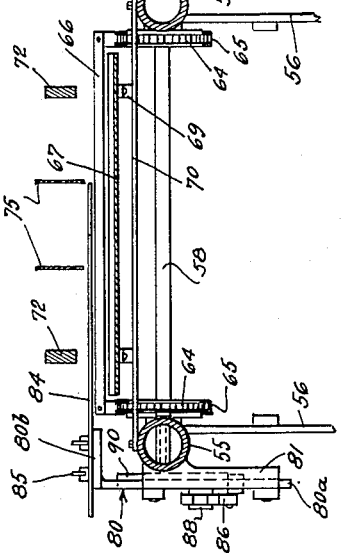
*Inventor.*
William Walter Hartman,
*Attorney.*

Feb. 25, 1936. W. W. HARTMAN 2,031,949
MECHANISM TO ASSEMBLE A COMPOSITE LOAF
Filed Oct. 24, 1932  3 Sheets-Sheet 3
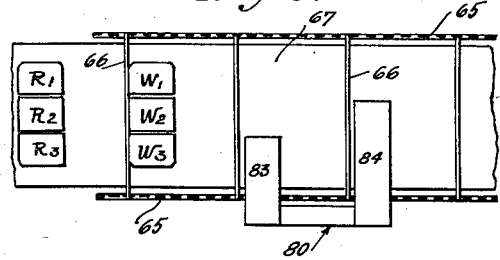
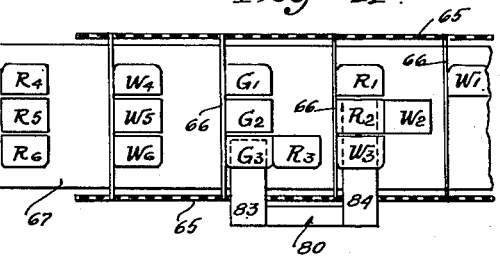
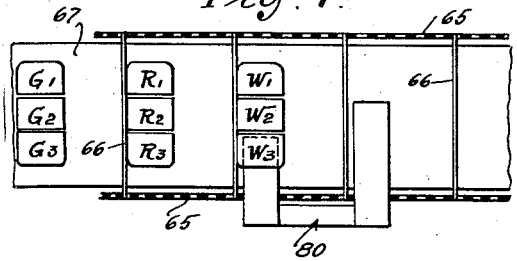
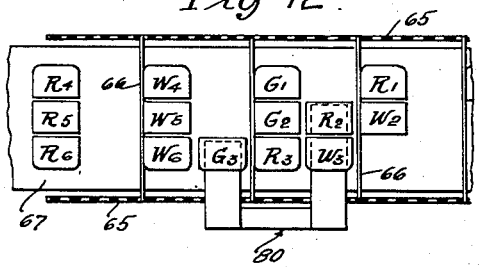
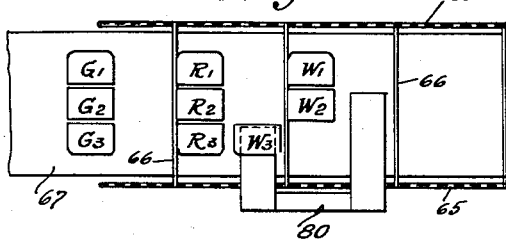
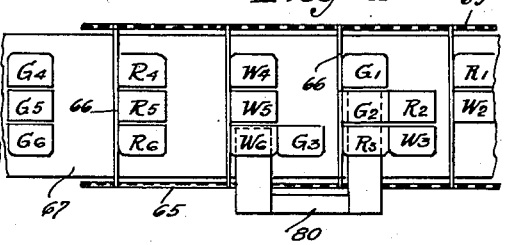
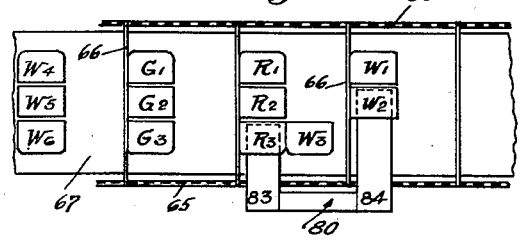
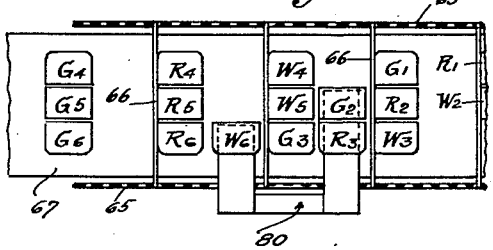
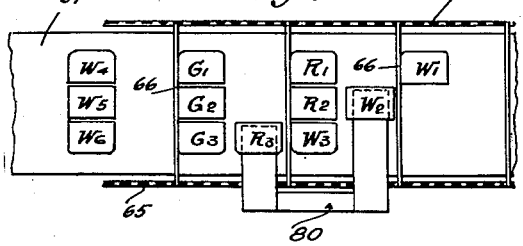
Inventor
William Walter Hartman
Attorney Patented Feb. 25, 1936

2,031,949

UNITED STATES PATENT OFFICE 2,031,949

MECHANISM TO ASSEMBLE A COMPOSITE LOAF

William Walter Hartman, Los Angeles, Calif.

Application October 24, 1932, Serial No. 639,318

14 Claims. (Cl. 146—153)

This invention has to do generally with bread handling machinery, and more particularly with mechanism to assemble a composite loaf having sections of several different kinds of bread. The final composite loaf is formed of sections from successive loaves of the several kinds of bread desired. Since my invention is particularly adapted to use with sliced loaves, it will be described in that aspect; but it will be understood that I am not to be limited to such use alone for the mechanism may be readily adapted to handle articles other than bread loaves.

It has been inconvenient for a family to supply itself with more than one kind of bread at a time because it has been necessary to buy an entire loaf of each of the several kinds and before all the loaves are consumed the remaining bread has become stale. To keep the bread fresh, it is necessary to purchase smaller units of bread than the ordinary loaf so that the bread is used up in a short time.

The production of small loaves has not been economical; but with the advent of sliced bread, it has become possible to make up a composite loaf having sections of white, graham, rye, raisin, whole wheat, or any other kind of bread. Such a loaf may have two or more kinds of bread in equal or unequal proportions. To economically produce composite loaves requires speed so that the loaves are assembled at a rate comparable with the rate the loaves are handled by the automatic slicing and wrapping machines in ordinary use.

Hence it becomes a general object of my invention to provide a mechanism which will receive a series of sliced loaves, separate the loaves into sections, and reassemble sections from successive loaves into a composite loaf.

It is a further object of my invention to provide a mechanism that will operate in conjunction with the discharge conveyor from a standard type of slicer and at the same rate that the slicer handles the loaves.

An additional object is to provide a mechanism that may readily be made operative or inoperative, and when the latter will not interfere with the discharge of normal sliced loaves from the slicer. Also it is desired to make the assembly mechanism adjustable to make up the final of two or more sections as desired, and to form the loaf sections of varied sizes as wanted.

In a mechanism characteristic of my invention the successive loaf units are cut into sections which are divided apart and confined by guides inserted into a slice cut. An elevator is provided to lift certain of the sections from the discharge conveyor to stop temporarily the progress of the sections on the elevator but without interfering with the sections not so removed. The sections on the elevator are subsequently replaced on the conveyor where they are alined with sections from other loaves to form the new composite loaf.

Since this mechanism is illustrated as being used with sliced bread, the loaf sections are subdivided into the individual slices but such subdivision is merely incidental. Broadly speaking, the slicing mechanism need only be such as will cut the loaf unit into the required number of major sections; and when there is substituted for a loaf an article already in sections, no slicing mechanism is needed.

The general method is to pass the loaf units through the cutting mechanism in reoccurring groups, each group containing as many loaf units as there are kinds of bread. The loaves are cut into sections by the cutting mechanism, and if the final composite loaf is to be of equal proportions of each kind of bread the number of sections in each loaf unit is equal to the number of kinds of bread or the number of units in each group. As the loaf units with the sections longitudinally alined move along the conveyor, a selected section is temporarily stopped to transpose that section to the next succeeding loaf unit. When each unit comprises more than two sections, the transposing operation is repeated, moving at each transposition the previously transposed section or sections together with one more section from the unit being broken up. The transposing movement is, in effect, rearwardly on the conveyor as the units are advanced along the conveyor, for the transposition is from a given unit to the next succeeding unit, and then from the second unit to the one next following. The transposed sections are alined in their new position and move along as parts of a new unit.

For simplicity in disclosure, the slicer herein illustrated is a simplified form described in my copending application 544,429 filed June 15, 1931, and is typical of such slicers as may be used. Other slicers may be used, such as the one forming the subject matter of my copending application 429,050 filed Feb. 17, 1930.

The above and other objects and advantages and how they are attained will be better understood from the following description and the annexed drawings wherein is shown and described a present preferred form of my invention.

In the drawings:

Fig. 1 is a side elevation of a bread slicer equipped with mechanism to assemble composite loaves of sliced bread;

Fig. 2 is a fragmentary perspective showing the method of supporting the interior loaf division guides;

Fig. 3 is a plan view taken on line 3—3 of Fig. 1;

Fig. 4 is a vertical section through the loaf conveyor showing the assembly mechanism on line 4—4 of Fig. 1;

Fig. 5 is an enlarged fragmentary elevation of the assembly mechanism; and

Figs. 6 to 14 inclusive are diagrammatic views showing successive positions of loaves on the conveyor as the loaf sections are separated and reassembled to form composite loaves.

The slicing mechanism or slicing head illustrated in Figs. 1 and 2 is described in detail in my copending application Ser. No. 429,050 filed Feb. 17, 1930, which may be referred to for an extensive description of the slicing head, only a brief description being given herein. The form shown is one of my preferred types of slicer heads and is typical of such mechanism as may be used. In my copending application 608,754 filed May 2, 1932, I show a slicing head in which the knives are offset from one another in the direction of loaf movement so as to form a V against which the loaf is moved; and it will be readily apparent that this or other arrangement of knives may be used.

Mounted on base 10 is crank-case 11 within which is journaled eccentric-shaft 12. The eccentric-shaft is driven from motor 14 by belt 15 which passes over pulley 16 fastened on an end of the eccentric-shaft projecting out of the crankcase. Eccentric-shaft 12 has a plurality of eccentrics 12a to which are attached, by means of eccentric straps 17 and push rods 18, which latter have a bearing in guide block 19 mounted on top of crank-case 11, a series of horizontally spaced, vertically reciprocating slicing knives 20 disposed in the path of the bread loaves. Knives 20 are spring supported at their upper ends from cross bar 21 mounted at the top of uprights 22. Springs 23 permit knives 20 to move vertically and at the same time keep the knives, which are relatively thin and flexible, under a continual longitudinal tension.

Mounted on guide block 19, is bracket 25 which supports plate 26 upon which the loaves rest as they are moved past cutters 20. The plate is slotted so that the knives may pass through it. The unsliced loaves are fed onto plate 26 by being placed upon the gravity chute 28, carried by supports 29, 30 the chute being so shaped as to drop the loaves into position C ahead of cutters 20. Longitudinal side rails 31 are provided to position the loaves laterally on the chute, and guard plate 32 is provided to prevent the loaves from falling into the upper part of the knives.

The means for feeding loaves to and through the slicing knives includes reciprocating ram 35 slidingly mounted in bearings 25a and 30a on bracket 25 and support 30 respectively, said bearings being so positioned that the ram moves in a direction substantially parallel to plate 26. At the forward end of ram 35 is pusher 36 adapted to press against the rear side of the loaf moved through cutters 20. As may be seen in Fig. 3, pusher 36 is composed of a plurality of fingers 36a positioned to pass through the spaces between adjacent cutters 20 so that the forward movement of ram 35 will push the loaf C completely through the slicing knives and deposit the sliced loaf at some position D beyond the knives.

Fingers 36a may be mounted on head plate 37 which is bent rearwardly to form apron 38. The forward stroke of ram 35 moves apron 38 under the lower loaf B upon the gravity chute and holds up that loaf until the ram is retracted, thus permitting the loaf B to drop to the position C on plate 26.

Ram 35 is reciprocated by means of oscillating arm 40 to which it is attached by link 41. Arm 40 is pivoted at its lower end to base 10 and is slotted to receive crank pin 42 on disc 43 mounted on one end of shaft 44 journalled in pedestal bearing 45. Shaft 44 is driven by sprocket 46, power being transmitted thereto by chain 47 from sprocket 48 which is driven from motor 14 through an intervening speed reducer 49, as seen in Fig. 3.

Sprocket 46 is loosely mounted on shaft 44 and a clutch 50, operated by handle 51, is adapted to lock sprocket 46 to the shaft when a driving connection is desired. The driven element 50a of the clutch is keyed to shaft 44 and contains pin 52, which, when in the position of Fig. 3, locks sprocket 46 to this driven element. Declutching is effected by moving handle 51 towards the clutch, thus causing rock lever 53 to withdraw pin 52 and disconnect sprocket 46 from the clutch.

The loaf conveying means includes, in addition to the feed means above described, a conveyor for conveying sliced loaves away from the slicing mechanism. This conveyor comprises a pair of side rails 55 supported from base 10 by braces 56 and 57, and carrying at their ends bearings for sprocket shafts. Only one shaft is shown and that is drive shaft 58 at the end of the conveyor nearer the slicing mechanism. The other end of the conveyor is constructed similarly, only the shaft carries idler sprockets. Shaft 58 is driven from motor 14 by chain 60 running over sprockets 61, on shaft 58, and 62 on the same shaft as sprocket 48.

On shaft 58 is a pair of sprockets 64 driving at a uniform speed the conveyor chains 65 which carry cleats 66 extending across between the two chains. The cleats are arranged to move along and just above conveyor plate 67 upon which the sliced loaves ride. This plate is mounted on brackets 69 supported on side rails 55 by cross bars 70 (Fig. 4) and forms an extension of plate 26, though the two plates are slightly spaced, as in Fig. 5, to permit cleats 66 to come up between them. End guides 72 are adjustably supported from uprights 22 and brackets 73 to confine the loaves endwise so that the slices may be held together as the loaf is moved along the conveyor.

As explained above, the forward stroke of feed ram 35 deposits a sliced loaf at D on the forward end of plate 26. It will then be understood that the loaf moved forward by the succeeding stroke of the ram displaces the loaf at D, moving it, the first loaf, onto conveyor plate 67 after which it is moved along the plate by one of the constantly moving cleats.

The mechanism for assembling a composite loaf operates in conjunction with this conveyor, though it will be seen that the assembling mechanism can be adapted to other types of conveyors. As a first step in the assembling operation, the loaf is divided at a slice cut into two or more portions that will be combined with similar portions of other loaves to form the final composite loaf. These portions into which the loaf is separated and which are recombined to form the final composite loaf will herein be termed loaf sections, or divisions, and will be thus distinguished from the individual slices of the loaf. However, as will later appear, it is not essential that the loaf sections be sliced since these divisions might be units integral within themselves.

The dividing of the loaf into sections is accomplished by interior guides 75 which are thin sheets supported between end guides 72 from cross bars 76 and 77 mounted on uprights 22 and brackets 73 respectively. As shown by Fig. 2, each interior guide is supplied with a U-shaped clamp 75a which slips over cross bar 77 by longitudinal movement of the guide. The guide is held in position against either lateral or longitudinal displacement by set screw 75b in the clamp. Similar clamps support the guides from cross bar 76. In this way the guides are made easily removable and are laterally adjustable so that they may be brought opposite any desired slice cut in the loaf.

Guides 75 have thin forward edges that are placed close behind a rear non-cutting edge of a knife 20 so that movement of the loaf inserts the guide into a slice cut while the cut is held open by the knife blade. The insertion of the guide is more easily done at this point than later when the loaf is farther advanced.

These interior guides not only perform the function of dividing the sliced loaf into the proper number of sections of the desired size, but act to guide the sections as they are moved along the conveyor and act, in conjunction with the end guides, to confine the sections so that the slices are held together to be moved as a unit. These latter functions will be more apparent in the subsequent description.

The means for separating the loaf divisions and sorting them into composite loaves includes means to temporarily stop the progress of the loaf along the conveyor by lifting the divisions off plate 67 above the reach of cleats 66. The elevating means is generally indicated at 80 in Fig. 5, and comprises a T-shaped body of which the stem 80a slides vertically in guide 81 fastened to a guide rail 55, and the head 80b carries two lifting plates 83 and 84 that extend laterally across and parallel to plate 67 of the conveyor. From Figs. 3 and 4 it will be seen that the lifting plates are slotted to permit adjustment across the conveyor to bring the ends of one plate into vertical alinement with each of interior guides 75, the plates being secured in position to elevator head 80b by tightening wing nuts 85.

The elevator is operated by lever 86 pivoted at 87 to an extension of bracket 81. One end of the lever is forked to receive pin 88 in elevator stem 80a, and the other end of the lever carries cam follower 89 which bears against cam 90 attached to shaft 58. With the cam in the position of Fig. 5, the elevator is down; and when the cam turns to bring the portion of longest radius against follower 89, lever 86 rocks to lift the elevator as in Fig. 1. The upward movement of the elevator is timed to occur when, as seen in Fig. 3, one or more sections of the loaf have been moved by cleats 66 onto plates 83 and 84. The loaf sections on plates 83 and 84 are lifted sufficiently to clear cleats 66 which pass underneath the lifting plates and continue to move forwardly those other loaf divisions which remain upon conveyor plate 67. As an aid to moving the loaves onto the lifting plates, there are provided bars 92 fixed to plate 67 adjacent the elevator plates. The leading edge of bars 92 is tapered and acts as a ramp to lift the loaf onto the adjoining elevator plate which, as in Fig. 5, is resting on the conveyor when in loaf receiving position.

As an aid in describing the operations attendant upon the formation of a composite loaf, the movement of the elevator will be described in conjunction with periods or cycles of operation of the slicer and discharge conveyor. This cycle as herein referred to is determined by a complete operative cycle of the feed ram 35 and so becomes in effect the time elapsing from the movement of the loaf from any given point until the arrival of the next successive loaf at the same point. Since there is one feed stroke of ram 35 for each cycle of operation, there will be one loaf moved from position D onto the left hand end of the discharge conveyor during each cycle, and conveyor chain 65 must necessarily move at such a rate that a cleat 66 will pass any given point once for each cycle. From this it follows that the distance between cleats represents the movement of a sliced loaf on the conveyor during one cycle.

A very convenient gear ratio is such that drive shaft 58 revolves once for each cycle. Under this condition, a cam of the shape illustrated in Figs. 1 and 5 will raise the elevator once during each cycle, the periods of rest at the top and bottom of the stroke being substantially equal. The upward movement of the elevator is timed to begin shortly before a loaf is centered on lifting plate 83 and is completed in time for the cleats to move under the plate without interference, the contact between the loaf and cleat being maintained for such a length of time as to substantially center the loaf upon the lifting plate. The downward movement of the elevator will begin when or shortly after the cleat passes from under plate 83. It will be clear that, in order to lift loaf sections simultaneously on plates 83 and 84, these plates are spaced, center to center, a distance equal to the spacing of cleats 66 so that the two plates occupy the same relative positions with relation to successive cleats.

The successive positions of the loaves and their several divisions as they move along the discharge conveyor and are assembled into a composite loaf are illustrated by Figs. 6 to 14. There is an interval of one cycle between Figs. 6 and 7 and an interval of one half cycle between each of the following figures. For purposes of illustration, the loaf is described as being split into three sections, and elevator 80 as carrying two lifting plates, though it will be understood that the loaf may be split into a greater or lesser number of sections and the assembly mechanism changed accordingly.

Figs. 6 and 7 show the beginning positions of a loaf of white bread, a loaf of raisin bread, and a loaf of graham bread, which are indicated by the letters W, R, and G respectively. There being three kinds of bread, these loaves have been divided into thirds, designated by sub-numerals 1, 2, 3 and so on, and the final composite loaf will be composed of one third of each of the three kinds of bread. In Fig. 6, the white loaf is being initially moved along plate 67 by one of cleats 66, the cleat holding the sections in longitudinal alinement. In Fig. 7, one complete cycle later, the white loaf has been advanced still longitudinally alined, so that one of these divisions is now being moved onto lifting plate 83, the elevator being in the down position as in Fig. 5.

The positions one half cycle later are shown in Fig. 8. Elevator 80 has raised, permitting a cleat to pass underneath the plate with the result that the sections $W_1$ and $W_2$ are still being advanced along the conveyor plate while the section $W_3$ has been temporarily stopped, thus separating it from the other sections as it remains upon the lifting plate. In this position the elevator is ready to begin its downward movement as the cleat has moved out from under the loaf section on the elevator.

After the passage of another half cycle (Fig. 9), both of the lifting plates are down and loaded preparatory to another lifting movement. Division $W_1$ is being moved past the end of plate 84 which only extends to the far edge of division $W_2$ now on the lifting plate. The following loaf of rye bread has now reached the position opposite plate 83 and the loaf division $R_3$ has, by direct contact moved section $W_3$ off the elevator onto the conveyor plate.

Fig. 10 shows that, a half cycle later, section $W_1$ has been separated from $W_2$ and is being moved along uninterruptedly while $W_2$ has been stopped and is resting on the elevator. Section $W_3$ has been displaced from elevator plate 83 and pushed back onto the conveyor where it is again contacted by a cleat and is now being moved forwardly in the former place of section $R_3$ which is now at rest on plate 83. The transposition of $W_3$ to the succeeding loaf unit is now finished, and if there were only two kinds of bread and the loaves were cut into halves, the assembling of the composite loaf would be complete at this time for it will be noted that there is being moved by a single cleat a loaf made up of two kinds of bread, namely the loaf $R_1 R_2 W_3$. By reviewing the previous diagram, it will be seen that the section $W_3$ has been separated or displaced from the remainder of the loaf by temporarily halting that section while the rest of the loaf continues to move forwardly so that the displacement of that section is in the direction of loaf movement. A similar displacement of the section $R_3$ then takes place, the latter loaf division bodily replacing section $W_3$ in its position on the elevator and returning it to the conveyor. The rest of the raisin loaf is then moved forwardly and as it does so the section $W_3$ is picked up and longitudinally alined by the cleat with the sections $R_1$ and $R_2$ to form a composite loaf that is one third white bread.

Continuing the operations to form a composite loaf of three kinds of bread, another half cycle of movement brings the loaves into the position of Fig. 11. Division $W_1$ is being moved on alone and division $W_2$ has just been displaced from the elevator by contact with division $R_2$ which, together with section $W_3$, has just moved on to the elevator. Section $R_3$ has been returned onto the conveyor in a similar manner by division $G_3$ of the graham loaf which is now moved on line with elevator plate 83 and occupies the position the raisin loaf did in Fig. 9.

After the loaded elevator has been raised and the cleats have moved under the lifting plate, the loaf sections are in the position of Fig. 12 with the sections $R_1$ and $W_2$ being moved forwardly together. These sections $R_2$ and $W_3$, one of which has been transposed previously, are now in the initial stages of being transposed to a succeeding loaf unit, an operation that is completed in Fig. 14. A second composite loaf has been formed of the sections $G_1$, $G_2$, and $R_3$. Just as the individual sections of the first loaf have been delayed and displaced in the direction of loaf movement, as in Fig. 10, so now the sections of the raisin or second loaf are now separated from each other. By this time a second white and a second raisin loaf have advanced to positions within the limits of my diagram.

A half cycle advance from the previous position causes the second white loaf to move off the third section of the graham loaf, leaving the first section of the white loaf on the first elevator plate. Also, sections $G_2$ and $R_3$ have respectively displaced sections $R_2$ and $W_3$ which are now resting upon the conveyor plate. Sections $R_1$ and $W_2$ are being moved onwardly.

The formation of the first composite loaf composed of a section of each of the three kinds of bread is accomplished by the time the position of Fig. 14 has been reached, when the transposing operation is completed that moves sections $W_3$ and $R_2$ into the succeeding loaf so that that succeeding loaf, originally graham, is now made up of sections $G_1$, $R_2$ and $W_3$. The section $G_1$, is all that remains of the original unit, the new unit being formed by substitution. At this time the elevator is raised and is holding stationary the sections $W_6$, $G_2$, and $R_3$. The movement of the cleats underneath the lifting plate has advanced section $G_1$ into longitudinal alinement (lateral of the conveyor) with sections $R_2$ and $W_3$, which latter sections are shown as being contacted by the cleat, and the composite loaf made up of these three sections is being moved off the conveyor.

From this point on, each cycle results in the formation of another composite loaf, so the position of any given kind of bread will vary within the final loaf. For example, the final loaf following the position of Fig. 14 will be made up of sections $W_4$, $G_2$, and $R_3$ and the next succeeding loaf will be made up of sections $R_4$, $W_5$, and $G_3$. It will be observed that the relative positions of the white and raisin loaves in Fig. 14 is the same as in Fig. 8, and that consequently the succeeding positions of the loaves will be but repetitions of those already illustrated. One or more of interior guides 75 may be used depending upon the number of divisions into which the loaf is divided, and mounting of these interior guides makes for easy adjustment to bring the guides opposite any desired sliced cut since it is immaterial whether or not the several loaf sections are of equal or unequal sizes. As the loaves move along the conveyor, the end and interior guides serve not only to guide the loaf sections in a straight path along the conveyor, but to hold the slices together when the displacement of the several sections deprives them of their mutual supporting action. If the sections were integral units, the confining action of the guides would not be needed and the guides might be changed or omitted.

The temporary stopping of the advancing loaf sections results in a displacement of the sections relative to each other in the direction of loaf movement, i. e. the arrangement of the sections in echelon formation. When the load is made up of two sections only, the echelon is formed by the position of Fig. 8. When there are three sections per loaf, the echelon is completed in Fig. 10. In this first echelon as in Fig. 10, the displacement is one-half the cleat spacing; but when the final echelon as in Fig. 14 is reached (the sections $W_1$ and $W_2$ are outside the diagram) the displacement between sections is a full cleat space or the initial distance between loaves on the conveyor. The cleats then act as alining elements to longitudinally aline the sections from successive loaves, which are moved in unison along the conveyor as a new composite loaf.

As a typical illustration, it has been shown how a composite loaf having three different kinds of bread has been assembled, and it has also been shown how the same principle applies to the assembly of a two-section composite loaf. By the use of a suitable number of interior guides and of lifting plates on the elevator, the described mechanism may be readily adapted to assemble a loaf having more than the three sections illustrated. In the present instance, the mechanism illustrated may be readily changed to assemble a two-section loaf by removing one of guides 75 and centering the other guide along the longitudinal axis of the conveyor, and using the same elevator with either plate 83 or 84 extended to bring its end in approximate vertical alinement with the single guide 75, the other lifting plate being removed.

The elevator is adapted to the number of sections by removing or adding a plate. Provision is made to attach the maximum number of plates expected to be used, and then as many are attached as desired. From an operative condition, the elevator may quickly be made inoperative by removing all the plates, and in this state it does not in any way interfere with the normal discharge of the conventional loaf by the conveyor. It is not even necessary to remove the interior guides, though such may quickly be done.

Having now shown and described a present preferred embodiment of my composite loaf assembling mechanism, it is to be understood that the drawings and description are to be considered as illustrative of rather than as limitative upon the broader claims appended hereto, for various changes may be made in design and arrangement of parts without departing from the spirit and scope of said claims.

I claim:

1. In combination, mechanism adapted to cut each of a series of loaves or the like into sections, a conveyor discharging cut loaves from the cutting mechanism, means to remove temporarily a section from the conveyor, and means to assemble said section when returned to the conveyor with a section from a succeeding loaf.

2. In combination, mechanism adapted to cut a loaf or the like into sections, a conveyor to move the cut loaf, an elevator adapted to lift a section from the conveyor to temporarily stop its forward movement, means to return said section to the conveyor, and an alining element on the conveyor to aline said returned section with a section from a subsequent loaf.

3. In combination, mechanism adapted to cut each of a series of loaves or the like into sections, a conveyor adapted to discharge cut loaves from the cutting mechanism, an elevator to lift a section from the conveyor to stop its forward movement so that the sections of a loaf are arranged in echelon, means to return the removed section to the conveyor, and a cleat to advance in unison said returned section and a section from a succeeding loaf.

4. In a mechanism of the character described adapted to operate on a sectional loaf or the like, a conveyor cleat to move the loaf sections in alinement, an elevator to lift a loaf section above the cleat, and elevator operating means to actuate the elevator in timed relation with the cleat.

5. In a mechanism of the character described adapted to operate on a sectional loaf or the like, a conveyor cleat to move the loaf sections in alinement, an elevator to lift a loaf section above the cleat, and elevator operating means to actuate the elevator in timed relation to the cleat; said operating means comprising a drive shaft driving the cleat, a cam on the shaft, and a cam-actuated lever to raise and lower the elevator.

6. In a mechanism of the character described adapted to operate on a sectional loaf or the like, a conveyor cleat to move the loaf sections in alinement, guides to guide and confine the loaf sections during movement, an elevator having a lifting plate extending transversely across the path of the loaf to a point in vertical alinement with one of said guides and adapted to lift a section above the cleat, and elevator operating means to actuate the elevator in timed relation to the cleat.

7. A method of transposing sections of multi-section units to make up final units each containing sections initially comprised in other units, that includes providing in successive arrangement a repetition of groups of units, each group comprising dissimilar units and each unit comprising separate sections transposing a single section from one unit to the next successive unit; then transposing two sections, including the section previously transposed, from the last mentioned unit to the unit next succeeding it.

8. A method of transposing sections of multi-section units to make up final units each containing sections initially comprised in other units that includes providing in successive arrangement a repetition of groups of units, each group comprising dissimilar units and each unit comprising separate sections equal in number to the number of units in each group; transposing a single section from one unit to the next successive unit; then transposing two sections, including the section previously transposed, from the last mentioned unit to the unit next succeeding it.

9. A method of making up loaf units of bread, or the like, each containing sections of different characteristics, that includes cutting into sections successive units in successive group arrangements, transposing a section from each said unit to a successive unit, then transposing two sections, including the section previously transferred, from the last mentioned unit to the unit next succeeding it.

10. In combination, mechanism adapted to cut each of a series of loaves or the like into sections, a conveyor adapted to discharge cut loaves from the cutting mechanism, an elevator comprising two lifting members adapted simultaneously to lift from the conveyor selected sections of two successive loaves.

11. In combination, mechanism adapted to cut each of a series of loaves or the like into sections, a conveyor adapted to discharge cut loaves from the cutting mechanism, an elevator comprising two lifting members adapted simultaneously to lift from the conveyor selected sections of two successive loaves, one said member lifting two sections and the other member lifting one section.

12. The combination with an endless conveyor for conveying completely sliced loaves of bread, said conveyor having spaced flights each engageable with a sliced loaf of bread to convey the same, of means for bodily transferring a portion of the slices of the loaf being conveyed by each flight from a position in front of said flight to a position rearwardly of said flight.

13. The combination with an endless conveying mechanism for conveying completely sliced loaves of bread, said mechanism having a table portion and a plurality of flights movable over said table portion each engageable with a loaf of bread to move the same along said table portion, of means extending longitudinally of said table above said flights for dividing the loaf of sliced bread being moved by each flight into a plurality of parts, each having a plurality of slices, and means for bodily transferring one of said loaf parts from a position in front of the fight to a position rearwardly thereof.

14. The combination with an endless conveying mechanism for conveying completely sliced loaves of bread, said mechanism having a table portion and a plurality of flights movable over said table portion each engageable with a loaf of bread to move the same along said table portion, of means extending longitudinally of said table above said flights for dividing the loaf of sliced bread being moved by each flight into a plurality of parts, each having a plurality of slices, means for bodily transferring one of said loaf parts from a position in front of the flight to a position rearwardly thereof, said last mentioned means including a movable plate normally resting on said table between a pair of flights to receive one of said loaf parts by the conveying action of the adjacent flight and to support said part, and means operating in timed relation with the conveying mechanism to bodily raise said plate each time a flight approaches the same to permit the flight to pass therebeneath and to lower said plate to normal position after the flight passes underneath.

WILLIAM WALTER HARTMAN.